US011898715B2

(12) United States Patent
Han

(10) Patent No.: US 11,898,715 B2
(45) Date of Patent: Feb. 13, 2024

(54) LAMP FOR VEHICLE HAVING A PLURALITY OF LIGHT SOURCE MODULES ARRANGED IN WIDTH DIRECTION WITH AN OPTICAL UNIT WITH A PLURALITY OF CORRESPONDING LENSES GROUPED SO AS THE EMIT MULTIPLE BEAM PATTERNS

(71) Applicant: SL Corporation, Daegu (KR)

(72) Inventor: Hyo Jin Han, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/154,010

(22) Filed: Jan. 12, 2023

(65) Prior Publication Data

US 2023/0258311 A1 Aug. 17, 2023

(30) Foreign Application Priority Data

Feb. 11, 2022 (KR) ........................ 10-2022-0018033

(51) Int. Cl.

| | |
|---|---|
| ***F21S 41/43*** | (2018.01) |
| ***F21S 41/33*** | (2018.01) |
| ***F21S 41/265*** | (2018.01) |
| ***F21S 41/692*** | (2018.01) |
| *F21W 102/135* | (2018.01) |

(52) U.S. Cl.

CPC ............. *F21S 41/43* (2018.01); *F21S 41/265* (2018.01); *F21S 41/33* (2018.01); *F21S 41/692* (2018.01); *F21W 2102/135* (2018.01)

(58) Field of Classification Search

CPC ........ F21S 41/151; F21S 41/265; F21S 41/40; F21S 41/43; F21V 5/007

See application file for complete search history.

(56) References Cited

U.S. PATENT DOCUMENTS

| | | | | |
|---|---|---|---|---|
| 6,891,333 | B2 * | 5/2005 | Tatsukawa | F21S 41/336 362/544 |
| 10,239,442 | B2 * | 3/2019 | Arai | B60Q 1/0683 |
| 2007/0201241 | A1 * | 8/2007 | Komatsu | F21S 41/153 362/544 |

FOREIGN PATENT DOCUMENTS

| | | | |
|---|---|---|---|
| DE | 102017205013 A1 * | 9/2017 | B60Q 1/0035 |

* cited by examiner

*Primary Examiner* — Robert J May

(74) *Attorney, Agent, or Firm* — United One Law Group LLC; Kongsik Kim; Jhongwoo Peck

(57) ABSTRACT

A lamp for vehicle includes a light emitting unit including a plurality of light source modules arranged in a vehicle's width direction, and an optical unit disposed in front of the light emitting unit, for transmitting light generated from at least one of the plurality of light source modules to form a beam pattern that includes at least one pattern region, and including a plurality of lenses corresponding respectively to the plurality of light source modules and integrally formed to be arranged in the vehicle's width direction. Each of the plurality of light source modules includes a light source that generates the light, a reflector configured to reflect the light of the light source forward, and a shield configured to block a portion of the light reflected by the reflector and proceeding toward the optical unit.

20 Claims, 24 Drawing Sheets

LAMP FOR VEHICLE HAVING A PLURALITY OF LIGHT SOURCE MODULES ARRANGED IN WIDTH DIRECTION WITH AN OPTICAL UNIT WITH A PLURALITY OF CORRESPONDING LENSES GROUPED SO AS THE EMIT MULTIPLE BEAM PATTERNS

CROSS-REFERENCE TO RELATED APPLICATION

This application claims priority from Korean Patent Application No. 10-2022-0018033 filed on Feb. 11, 2022, which is incorporated herein by reference in its entirety.

BACKGROUND

1. Technical Field

The present disclosure relates to a lamp for a vehicle. More particularly, the present disclosure relates to a vehicle lamp that enables the implementation of a slim design while generating an optimal beam pattern.

2. Description of the Related Art

Vehicles are equipped with various types of lamps for an illumination function that allows the driver to easily check an object located around the vehicle at low light conditions (e.g., night-time driving) and a signaling function to notify the driving state of the vehicle to the surrounding vehicles or pedestrians.

For example, headlamps and fog lamps mainly serve the illumination function, and daytime running lamps, position lamps, turn signal lamps, tail lamps, brake lamps, or the like mainly serve the signaling function. The respective lamps are stipulated by laws and regulations for their installation standards and measures to ensure that they fully function.

Recently, not only the functional aspect that helps safe driving by securing the driver's visibility, which is the basic role of the vehicle lamps, but also the aesthetic aspect that consumers feel has a significant influence on consumers' purchase decision. Therefore, design improvements for the lamps are desired.

To this end, a means to slim down and thus improve the exterior design of the vehicle lamp, and a means for generating an optimal beam pattern while providing a slimmer vehicle lamp implemented with multiple lamp modules are demanded.

SUMMARY

Aspects of the present disclosure provide a vehicle lamp with a shield, which obstructs a portion of light that travels toward a beam-patterning lens, to be frontally reshaped based on the light distribution characteristics of lighting beam pattern regions to provide an optimal beam formation.

Aspects of the present disclosure also provide a vehicle lamp with a lens having a grid of a plurality of light emitting surfaces for transmitting light generated from a light source module to generate a beam pattern, thereby allowing design improvements of the vehicle lamp while providing an optimal beam formation.

However, aspects of the present disclosure are not restricted to those set forth herein. The above and other aspects of the present disclosure will become more apparent to one of ordinary skill in the art to which the present disclosure pertains by referencing the detailed description of the present disclosure provided below.

According to an aspect of the present disclosure, a lamp for a vehicle may include a light emitting unit including a plurality of light source modules arranged in a vehicle's width direction; and an optical unit disposed in front of the light emitting unit, for transmitting light generated from at least one of the plurality of light source modules to form a beam pattern that includes at least one pattern region, the optical unit including a plurality of lenses corresponding respectively to the plurality of light source modules and integrally formed to be arranged in the vehicle's width direction. Each of the plurality of light source modules may include a light source that generates the light; a reflector configured to reflect the light of the light source forward; and a shield configured to obstruct a portion of the light reflected by the reflector and proceeding toward the optical unit.

The plurality of light source modules of the light emitting unit may be grouped into a plurality of light source units, and the plurality of lenses of the optical unit may be grouped into a plurality of lens units. The plurality of light source units and the plurality of lens units may each be disposed along the vehicle's direction.

The plurality of light source units may include a first light source unit and a second light source unit, and the plurality of lens units may include a first lens unit corresponding to the first light source unit and a second lens unit corresponding to the second light source unit, respectively. The first light source unit and the first lens unit may form a first pattern region of the beam pattern, which is different from a second pattern region that is formed by the second light source unit and the second lens unit.

Among the plurality of light source modules and the plurality of lenses, at least one light source module and at least one lens corresponding to each other may be disposed to be tilted by a predetermined angle with respect to a reference line, which is a line parallel with a vehicle's length direction.

The shield of at least one of the plurality of light source modules may include a blocking surface configured to block a portion of the light reflected by the reflector, and a stepped portion configured to divide the blocking surface into two sides having different heights. The stepped portion may be formed to be disposed laterally spaced apart from an optical axis of a corresponding lens among the plurality of lenses by a predetermined distance. The stepped portion may be formed to be tilted by a predetermined angle with respect to an optical axis of a corresponding lens among the plurality of lenses.

The shield of at least one of the plurality of light source modules may have a frontal end formed in a curved shape gradually receding backward toward both sides from a center of the shield.

At least one light source module of the plurality of light source modules may further include an extension that protrudes from a front end of the reflector toward a corresponding lens among the plurality of lenses, and a first end of the extension that is closer to the reflector may be disposed above a second end thereof. The extension of the at least one light source module may be configured to elevate a lower boundary of the pattern region formed by the at least one light source module.

Each of the plurality of lenses may include a light incident portion, and a light emitting portion configured to emit the light incident to the light incident portion, and the light emitting portion may include at least one light emitting module, each including a plurality of light emitting surfaces disposed in a vertical direction. The light incident portion may have a curvature in at least one direction and may have a rearwardly convex shape. Each of the plurality of light emitting surfaces may be formed in a forwardly convex curve. The plurality of light emitting surfaces may be in a stepped or terraced arrangement gradually advancing in a top-to-bottom direction. The at least one light emitting module may include a plurality of light emitting modules, and the plurality of light emitting modules may be in a stepped or terraced arrangement gradually advancing or gradually receding from a first side to a second in the vehicle's width direction.

A light-blocking member may be further provided between adjacent light source modules among the plurality of light source modules. The light blocking member may be configured to obstruct the light generated from any one light source module of the plurality of light source modules from proceeding to a lens adjacent to a lens that corresponds to the any one light source module, among the plurality of lenses.

The vehicle lamp according to the present disclosure as described herein may provide one or more of the following advantages. The vehicle lamp according to the present disclosure can be implemented in a slimmer form factor with a plurality of light source modules and their corresponding lenses, which are arranged in the vehicle's width direction. The vehicle lamp according to the present disclosure can generate an optimal beam pattern with a shield particularly shaped based on the required light distribution characteristics of the lighting beam pattern regions to be formed by each of the plurality of light source modules. Further, the present disclosure can help improve the vehicle lamp design by including a plurality of lenses each having a grid of a plurality of light emitting surfaces.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
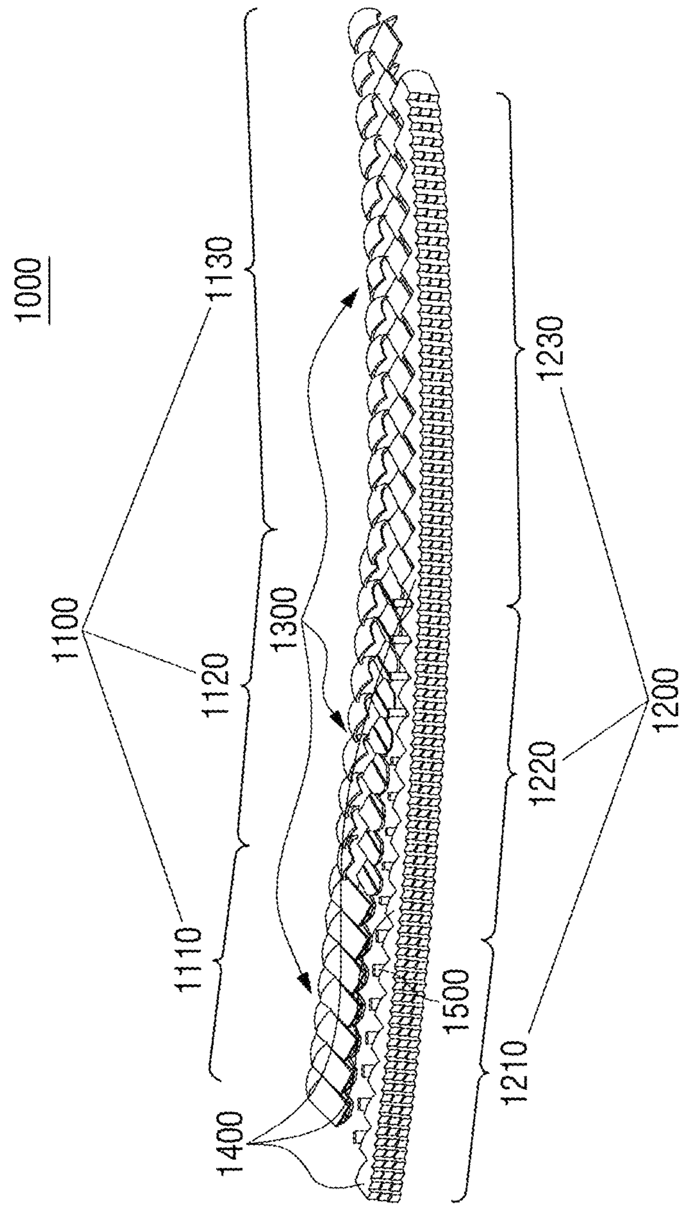
FIGS. 1 and 2 are perspective views of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements. In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the invention. As such, variations from the shapes of the illustrations as a result, for example, of manufacturing techniques and/or tolerances, are to be expected. Thus, embodiments of the disclosure should not be construed as limited to the particular shapes of regions illustrated herein but should be understood to include deviations in shapes that result, for example, from manufacturing. In the drawings, respective components may be enlarged or reduced in size for convenience of explanation.

Hereinafter, embodiments of the present disclosure will be described with reference to the attached drawings for a vehicle lamp.

Figure 2:
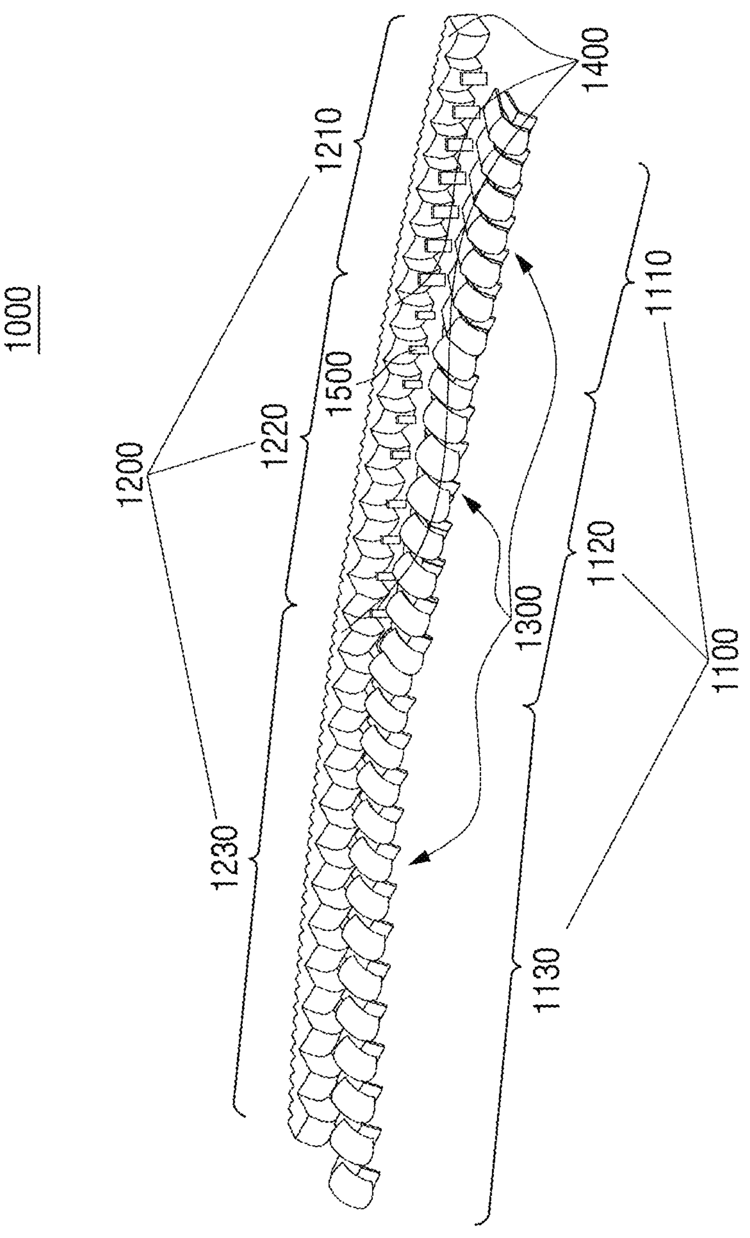
Figure 3:
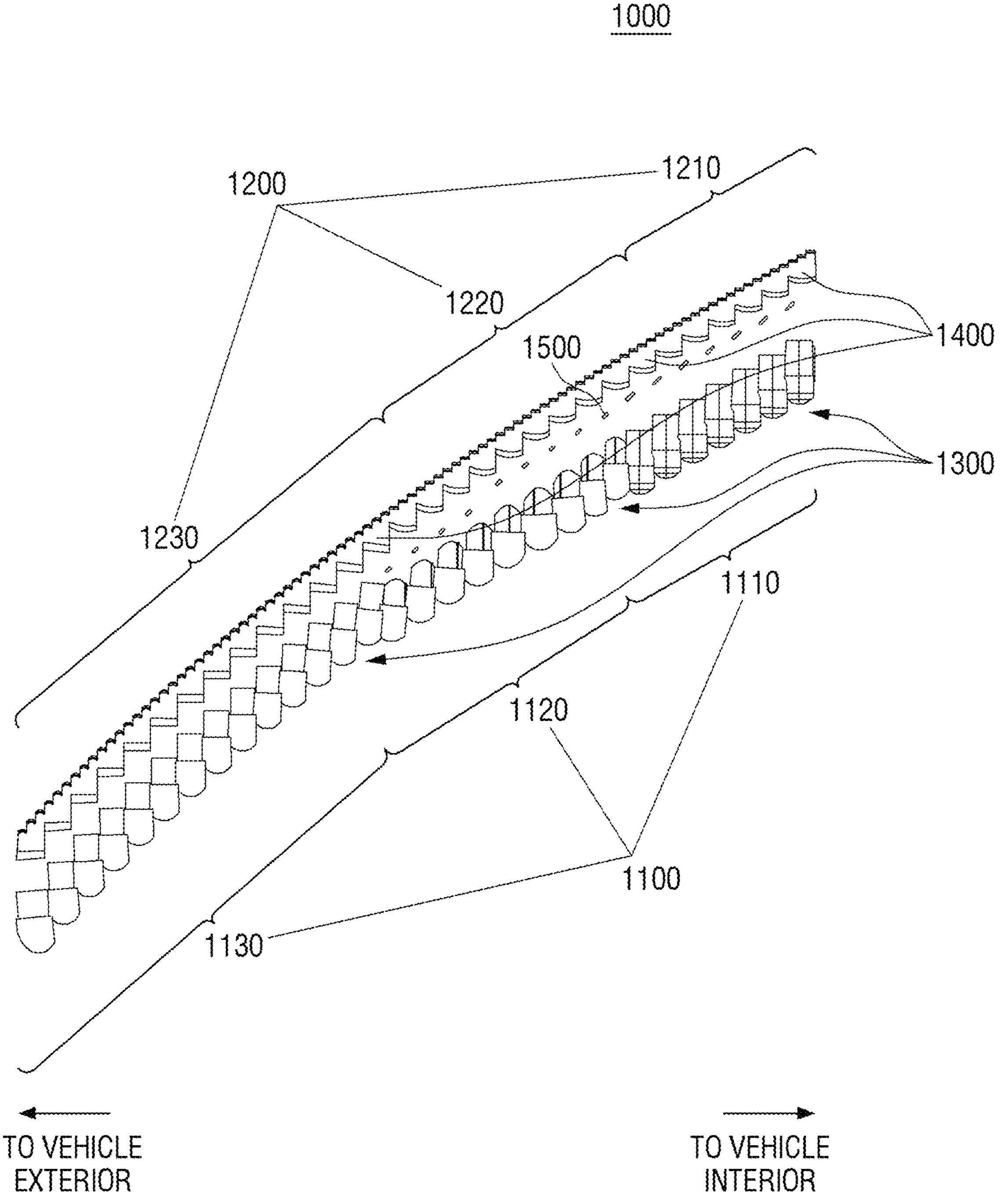
FIG. 3 is a plan view of the vehicle lamp according to an embodiment of the present disclosure.

FIGS. 1 and 2 are perspective views of a vehicle lamp 1000 according to an embodiment of the present disclosure. FIG. 3 is a plan view of the vehicle lamp 1000. Referring to FIGS. 1 to 3, the vehicle lamp 1000 according to an embodiment of the present disclosure may include a light emitting unit 1100 and an optical unit 1200.

In the present disclosure, the vehicle lamp 1000 will be described as an example of head-lamp used to secure a front view, by irradiating light in the driving direction of the vehicle. However, the present disclosure is not limited thereto, and the vehicle lamp 1000 of the present disclosure may be used not only for a head-lamp, but also for various lighting uses with a vehicle such as a tail lamp, a daytime running lamp, a position lamp, a turn signal lamp, a backup lamp, a brake lamp, a fog lamp, and the like.

When used for headlamps, the vehicle lamp 1000 of the present disclosure may generate a low beam pattern or a high beam pattern. The low beam pattern may be generated by irradiating light to a lower side with respect to a predetermined cut-off line to secure a wide viewing range in front of the subject vehicle while preventing glare from distracting drivers of preceding vehicles or oncoming vehicles. The high beam pattern may ensure a long viewing distance in front of the subject vehicle for the driver.

Figure 4:
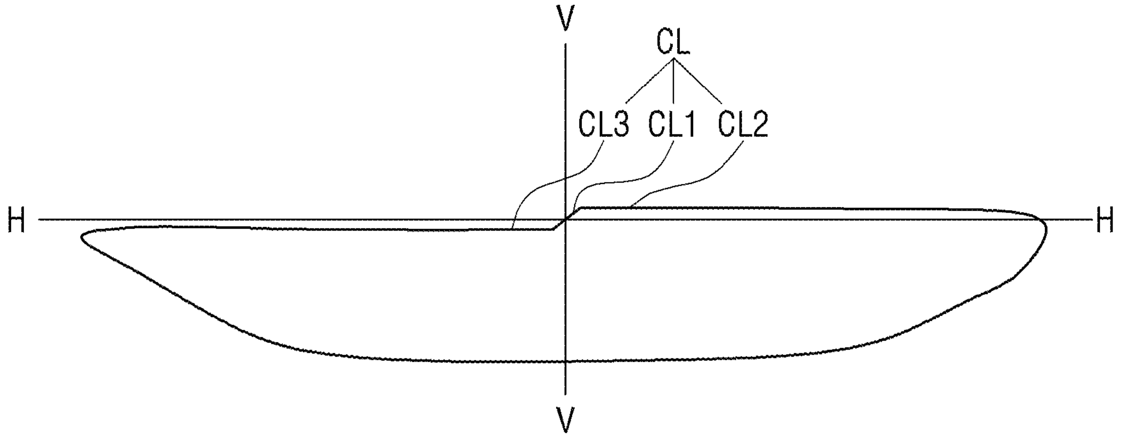
FIG. 4 is a schematic diagram of a beam pattern formed by the vehicle lamp according to an embodiment of the present disclosure.

Hereinbelow, description will be presented with reference to an example where the vehicle ramp 1000 forms a low beam pattern as shown in FIG. 4, in which light is irradiated to the lower side with respect to a cut-off line CL that includes an inclined line CL1, an upper line CL2 horizontally extending from the upper end of the inclined line CL1, and a lower line CL3 extending horizontally from the lower end of the CL1. The low beam pattern of FIG. 4 is an example beam pattern, which may be formed on a screen disposed at a set distance in front of the vehicle.

The light emitting unit 1100 may generate light having an amount and/or color suitable for the purpose of the vehicle lamp 1000 of the present disclosure, and the light generated from the light emitting unit 1100 may pass through the optical unit 1200 to form a beam pattern suitable for the use of the vehicle lamp 1000 of the present disclosure.

The light emitting unit 1100 may include a plurality of light source units 1110, 1120, and 1130 including different portions of a plurality of light source modules 1300 arranged in the vehicle's width direction. The following description will be provided for an example where the plurality of light source units 1110, 1120, and 1130 include a first light source unit 1110, a second light source unit 1120, and a third light source unit 1130, which are arranged along the vehicle's width direction. The first light source unit 1110 may be disposed at the most inner side of the vehicle, and the third light source unit 1130 may be disposed at the most outer side of the vehicle.

The plurality of light source modules 1300 may be arranged to gradually recede from the inner side of the vehicle toward the outer side thereof in the vehicle's width direction, which may render the plurality of light source modules 1300 to be in a conforming arrangement to the body contour of the vehicle. For example, the vehicle lamp 1000 of the present disclosure may be accommodated in a space formed by a lamp housing and a cover lens coupled to the lamp housing. The plurality of light source modules 1300 may be disposed in a conforming arrangement to the exterior contour of the cover lens that forms a part of the body line of the vehicle.

The above-described first light source unit 1110, second light source unit 1120, and third light source unit 1130 may respectively form different beam pattern regions, and the different beam pattern regions formed by the first light source unit 1110, the second light source unit 1120, and the third light source unit 1130 may collectively form an entire beam pattern suitable for the use of the vehicle lamp 1000 of the present disclosure.

Figure 5:
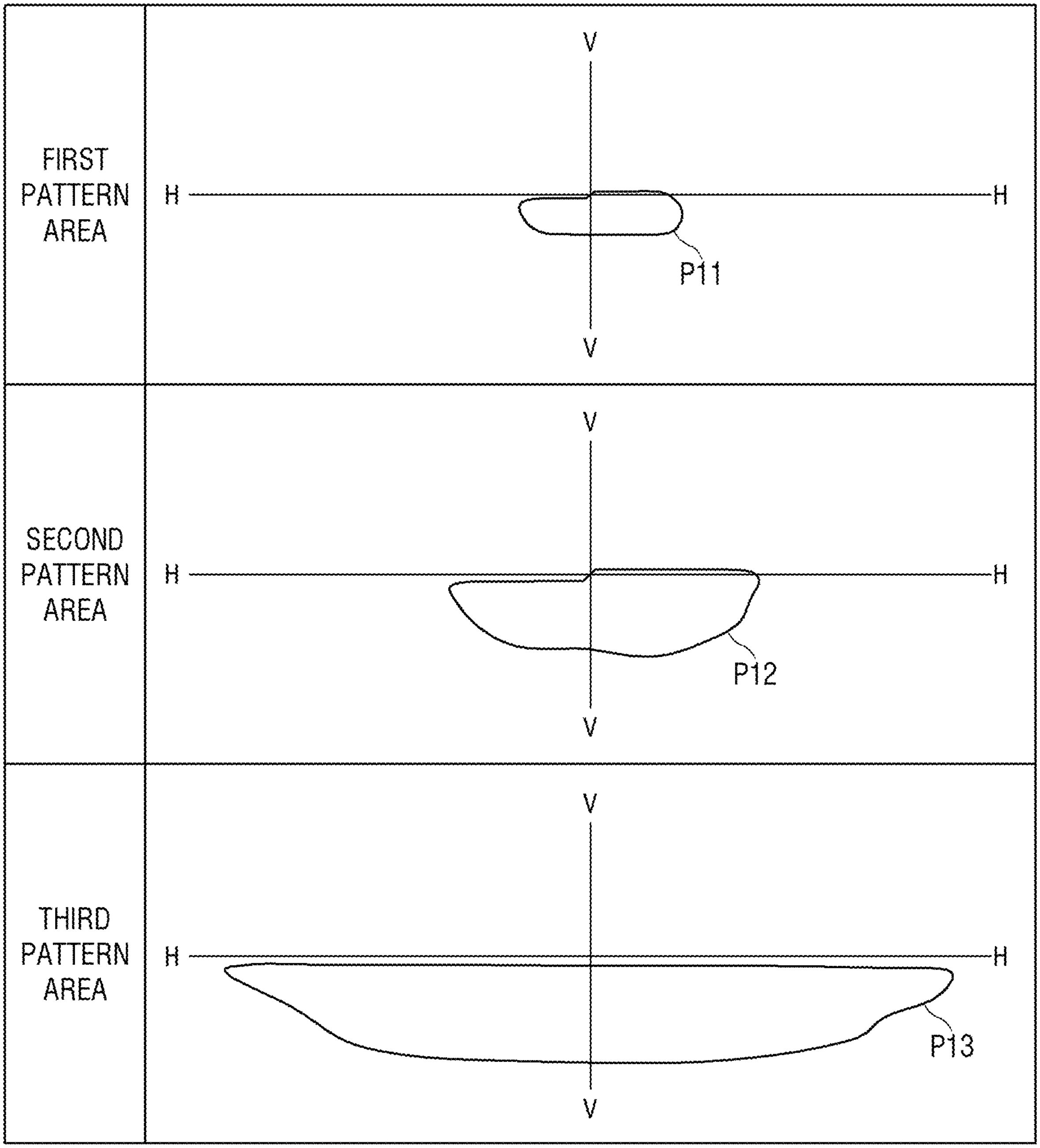
FIG. 5 is a schematic diagram of pattern regions of a beam pattern formed by the vehicle lamp according to an embodiment of the present disclosure.

In some embodiments of the present disclosure, the first light source unit 1110, the second light source unit 1120, and the third light source unit 1130 may respectively generate light beams for respectively forming a first pattern region P11, a second pattern region P12, and a third pattern region P13 as shown in FIG. 5. The following description will be provided for an example where the first pattern region P11 constitutes a spot region, the second pattern region P12 constitutes a mid-region that extends the spot region in at least one of the vertical or horizontal directions, and the third pattern region P13 constitutes a wide region that expands the mid-region in at least one of the vertical or horizontal directions.

At least two or more of the above-described first to third pattern regions P11, P12, and P13 may be formed to be separated from one another, or some of them may be formed to overlap.

Here, the spot region may exhibit a relatively high brightness to ensure a sufficient viewing distance in front of the vehicle. The mid region and wide region may be adapted to expand the spot region and the mid region respectively in at least one of the vertical direction or the horizontal direction to secure a wider field of view in front of the vehicle.

The plurality of light source modules 1300 described above may serve to form any one of the first pattern region P11, the second pattern region P12, or the third pattern region P13, respectively. Hereinafter, in an embodiment of the present disclosure, among the plurality of light source modules 1300, the light source modules belonging to the first light source unit 1110 are collectively referred to as a first light source module(s), and the light source modules belonging to the second light source unit 1120 are collectively referred to as a second light source module(s), and the light source modules belonging to the third light source unit 1130 are collectively referred to as a third light source module(s).

The optical unit 1200 may include a plurality of lenses 1400 that are integrally formed, corresponding respectively to the plurality of light source modules 1300, and arranged in the vehicle's width direction. The optical unit 1200 may include a plurality of lens units 1210, 1220, and 1230 including different parts of the plurality of lenses 1400 to correspond respectively to the plurality of light source units 1110, 1120, and 1130. The following description will be provided for the embodiments of the present disclosure by referring to the plurality of lens units 1210, 1220, and 1230 as the first, second, and third lens units 1210, 1220, and 1230 that correspond respectively to the first, second, and third light source units 1110, 1120 and 1130.

Additionally, among the plurality of lenses 1400, the lenses belonging to the first lens unit 1210 are collectively referred to as a first lens(es), the lenses belonging to the second lens unit 1220 are collectively referred to as a second lens(es), and the lenses belonging to the third lens unit 1230 are collectively referred to as a third lens(es).

In some embodiments, the light emitting unit 1100 may include three light source units 1110, 1120, and 1130, and the optical unit 1200 may correspondingly include three lens units 1210, 1220, and 1230. However, this configuration is only an example to help understanding the present disclosure, and the number of the light source units within the light emitting unit 1100 and the number of the lenses within the optical unit 1200 may be varied depending on the light distribution characteristics or the number of the pattern regions to be formed by the light emitting unit 1100.

Figure 6:
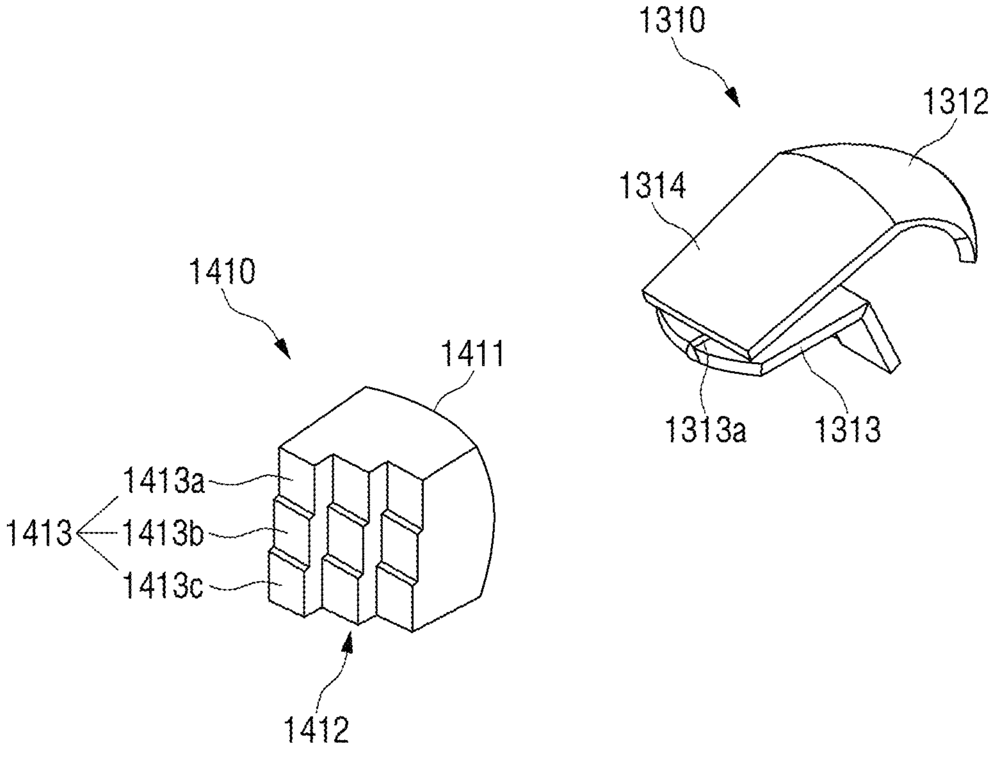
FIGS. 6 and 7 are perspective views of a first light source module and a first lens according to an embodiment of the present disclosure.
Figure 7:
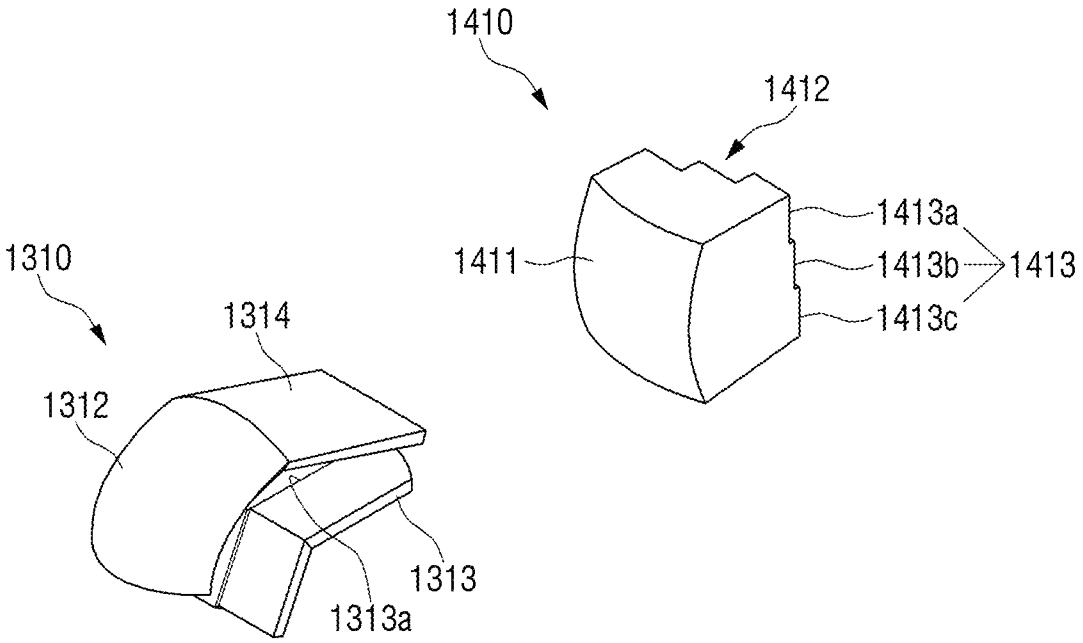
Figure 8:
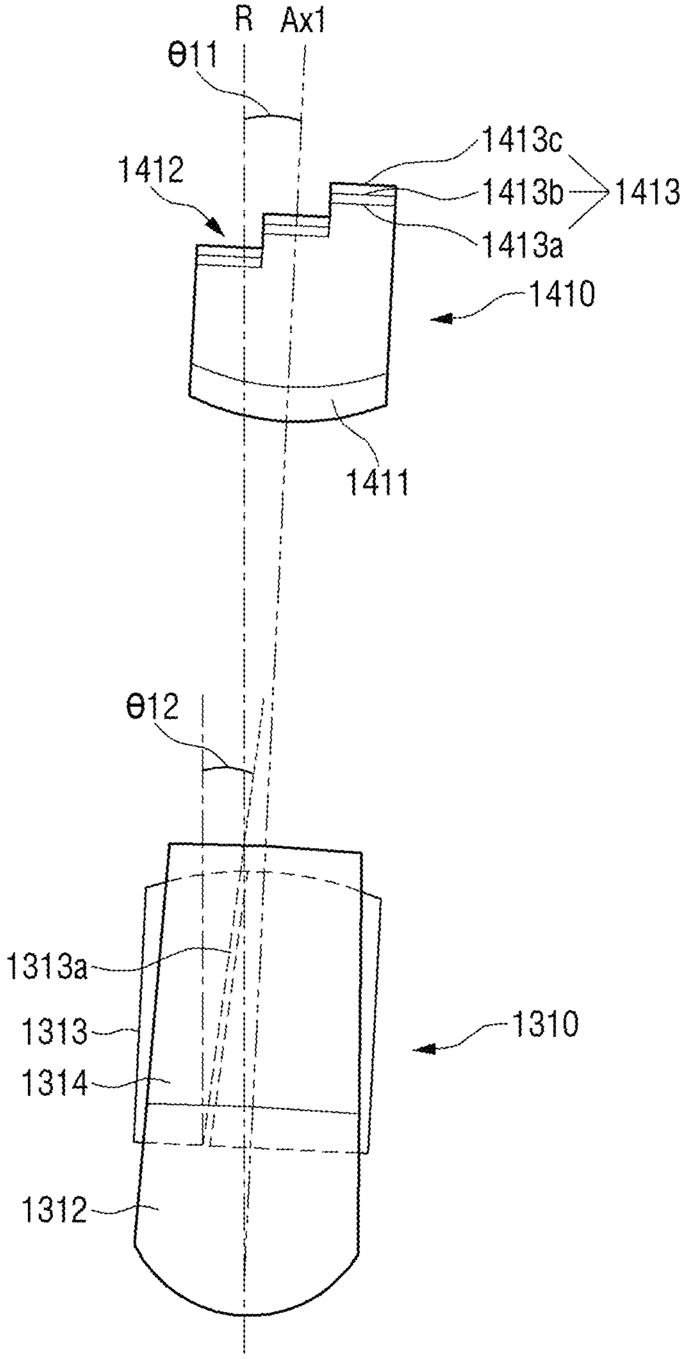
FIG. 8 is a plan view of the first light source module and the first lens according to an embodiment of the present disclosure.
Figure 9:
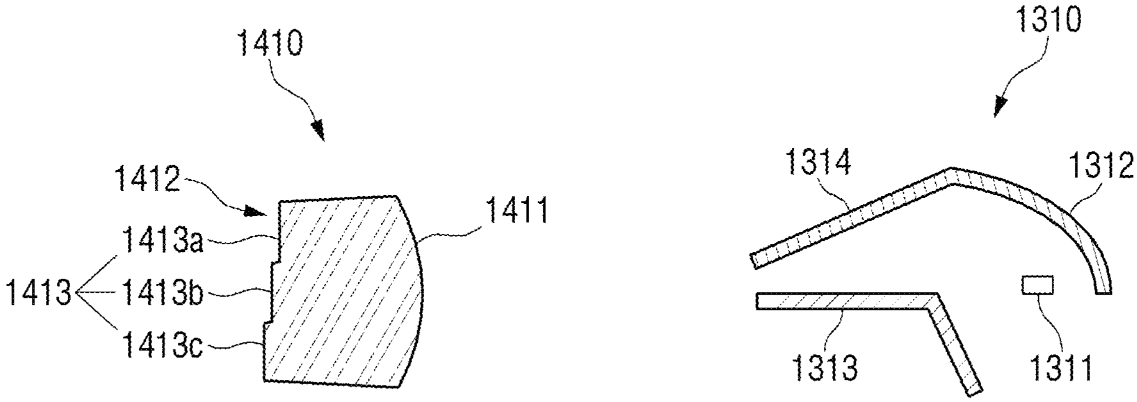
FIG. 9 is a cross-sectional view of the first light source module and the first lens according to an embodiment of the present disclosure.

FIGS. 6 and 7 are perspective views of a first light source module 1310 of the plurality of light source modules 1300 and a first lens 1410 of the plurality of lenses 1400 according to an embodiment. FIG. 8 is a plan view of the first light source module 1310 and the first lens 1410. FIG. 9 is a cross-sectional view of the first light source module 1310 and the first lens 1410.

Referring to FIGS. 6 to 9, the first light source module 1310 according to an embodiment of the present disclosure may include a first light source 1311 disposed at or near the rear focal point of the first lens 1410, a first reflector 1312 for forwardly reflecting the light generated from the first light source 1311, and a first shield 1313 for blocking some of the proceeding light after being reflected forward by the first reflector 1312.

The light-blocking surface, that is, the upper surface of the first shield 1313 may be formed with an off-set or stepped portion 1313*a*, by which two surfaces of the first shield 1313 are distinguished and made to have different elevations. The stepped portion 1313*a* may allow the vehicle lamp 1000 of the present disclosure to form the cut-off line as shown in FIG. 4, which includes the inclined line CL1, the upper line CL2, and the lower line CL3. Depending on the intended shape of the cut-off line, in some embodiments, no stepped portion may be formed on the light-blocking surface of the first shield 1313, and the light-blocking surface of the first shield 1313 may be formed to have a flat plate shape.

The stepped portion 1313*a* may be formed on and in parallel with a first optical axis Ax1 of the first lens 1410. However, where the first light source module 1310 and the first lens 1410 are tilted at a predetermined angle θ11 with respect to the reference line R, as shown in FIG. 8, the stepped portion 1313*a* may be laterally spaced apart from the first optical axis Ax1 of the first lens 1410 by a predetermined distance, in order to cause the cut-off line to be formed at the correct position.

Here, the embodiment of the present disclosure assumes the reference line R to be a line parallel to the longitudinal direction of the vehicle (i.e., vehicle's length direction). When the first light source module 1310 and the first lens 1410 are tilted at the predetermined angle θ11 with respect to the longitudinal direction of the vehicle, therefore, the stepped portion 1313*a* may be formed to be laterally spaced apart from the first optical axis Ax1 by a predetermined distance.

The reason for tilting the first light source module 1310 and the first lens 1410 with respect to the reference line R at the predetermined angle θ11 is to generate a complete lighting image regardless of a viewer's different viewing directions from outside the vehicle. Without such configuration, a relatively incomplete lighting image would likely be observed when viewed from one lateral side with respect to the front of the vehicle, whereas a more complete lighting image would be observed when viewed directly from the middle front of the vehicle. As described above, with the first light source module 1310 and the first lens 1410 disposed to be tilted at the predetermined angle θ11 with respect to the reference line R, the cut-off line would deviate from its correct position, i.e., the intersection of the line H-H and the line V-V of FIG. 4. In order to compensate for this deviation, the stepped portion 1313*a* may be positioned laterally off-set from the first optical axis Ax1, and thereby adjusting the low-beam pattern section where the upper line CL2 and the lower line CL3 are formed to allow the cut-off line to be formed at the correct, intended position.

Additionally, the stepped portion 1313*a* may be tilted at a predetermined angle θ12 with respect to the first optical axis Ax1, which configuration may ensure that the first pattern region P11 that is formed by the first light source module 1310 and the first lens 1410 satisfies light distribution characteristics, i.e., a size, shape, brightness, or the like that are required at the corresponding region to which the light is irradiated. If the first light source module 1310 and the first lens 1410 were positioned to be tilted at the predetermined angle θ11 with respect to the reference line R and the stepped portion 1313*a* were positioned parallel to the first optical axis Ax1, the first pattern region P11 may fail to satisfy the required light distribution characteristics.

The front end of the first shield 1313 may have a curved shape that is convex toward the first lens 1410, receding gradually toward both sides from its center, which is in response to the rearwardly convex curvature of the light incident portion 1411 of the first lens 1410. The shape of the front end of the first shield 1313 may be varied based on the shape of the light incident portion 1411 of the first lens 1410.

For example, unlike the present disclosure, making the light incident portion 1411 of the first lens 1410 planar would bring the focal point of the first lens 1410 to move toward the light incident portion 1411 going toward both sides of the light incident portion 1411 from the center thereof, and therefore, the front end of the first shield 1313 would be required to take a curved shape advancing toward the light incident portion 1411 going toward both sides from its center. However, since the embodiment of the present disclosure provides the light incident portion 1411 of the first lens 1410 with a curved shape that is convex backward toward the first light source module 1310 in the vertical and horizontal directions, the front end of the first shield 1313 may have a forwardly convex shape.

The present embodiment of the disclosure describes an example where the first light source module 1310 and the first lens 1410 are tilted by the predetermined angle θ11 with respect to the reference line R, but this is merely illustrative to help the understanding of the present disclosure. The present disclosure is not limited thereto, and each pair of the first light source module belonging to the first light source unit 1100 and the corresponding first lens 1410 may be parallel with the reference line R or be tilted at the predetermined angle θ11 with respect thereto.

Additionally, this embodiment of the present disclosure illustrates an example where the stepped portion 1313*a* is formed in the first shield 1313, with the stepped portion 1313*a* being laterally spaced apart from the first optical axis Ax1 by a predetermined distance as well as being tilted at the predetermined angle θ12 with respect to the first optical axis Ax1, but this is only an example to help the understanding of the present disclosure. The present disclosure is not limited thereto, and the first light source modules belonging to the first light source unit 1100 may each be modified in various aspects of whether to form a stepped portion 1313*a*, where it is formed, and by what angle it is tilted depending on the light distribution characteristics of the first pattern region P11.

Meanwhile, the first light source module 1310 may further include an extension 1314 formed to extend from the front end of the first reflector 1312 toward the first lens 1410. The extension 1314 may include a first end close to the first reflector 1312 and a second end that is disposed below the first end to satisfy the light distribution characteristic of the first pattern region P11.

Figure 10:
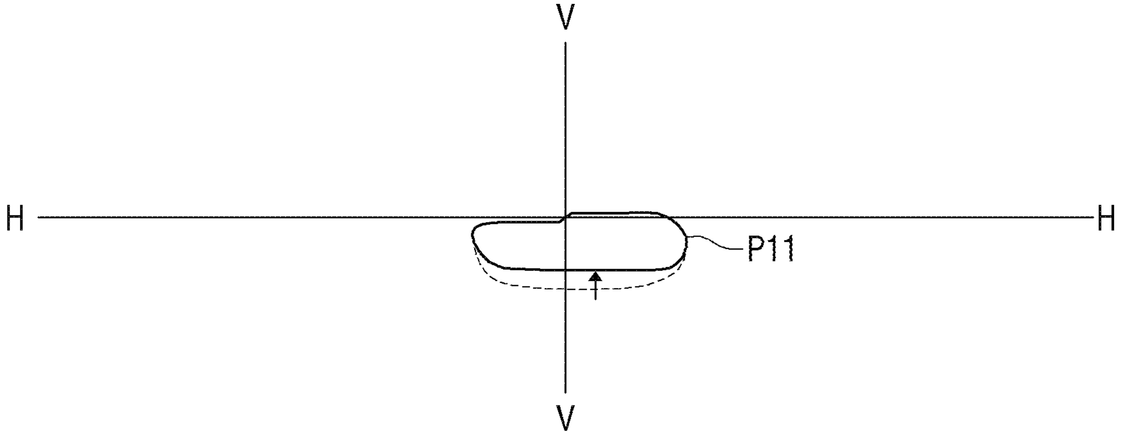
FIG. 10 is a schematic diagram of a beam pattern region modified by a light source module extension according to an embodiment of the present disclosure.

The broken line in FIG. 10 shows the first pattern region P11 when no extension is provided. As depicted in FIG. 10, due to the extension 1314, the lower boundary (broken line) of the beam pattern region may be elevated to the solid line. This enables the lower region of the spot region to satisfy the light distribution characteristics. The extension 1314 may be omitted depending on the light distribution characteristic of the spot region. In the present disclosure, the direction or length in which the position of the lower boundary of the pattern region may be changed by adjusting the formation angle and/or curvature of the extension 1314.

The light incident portion 1411 of the first lens 1410 may have a curved shape with a curvature in the vertical and horizontal directions since the first pattern region P11 is a spot region having a relatively high light concentration. The light incident portion 1411 of the first lens 1410 may be formed to have a curvature in the vertical direction, the horizontal direction, or a combination thereof, depending on the light concentration requirement for the first pattern region P11.

The light emitting portion 1412 of the first lens 1410 may include at least one light emitting module 1413, each of which may include a plurality of light emitting surfaces 1413*a*, 1413*b*, and 1413*c* that are arranged along the vertical direction. Further, in the embodiments of the present disclosure, a plurality of light emitting modules 1413 may be arranged along the horizontal direction (i.e., vehicle's width direction), and thus the light emitting portion 1412 may include a grid of the plurality of light emitting surfaces.

The plurality of light emitting modules 1413 may be formed to have a stepped or terraced arrangement gradually receding from a first side to a second side in the horizontal direction, thereby allowing the plurality of light emitting modules 1413 to be disposed conforming to the body contour of the vehicle.

In the embodiments of the present disclosure, the plurality of light emitting surfaces 1413*a*, 1413*b*, and 1413*c* may have a planar shape, thereby allowing the first light source module 1310 and the first lens 1410 to form the first pattern region P11 with a relatively high light concentration.

Additionally, the plurality of light emitting surfaces 1413*a*, 1413*b*, and 1413*c* may be formed in a terraced arrangement gradually advancing in a top-down (i.e., vertical) direction. This configuration may prevent glare from occurring by preventing the light emitted from a lower light emitting surface of the vertically adjacent light emitting surfaces from proceeding to and re-entering an upper light emitting surface. The configuration may also contribute to the aesthetics of the vehicle lamp by improving the exterior design thereof.

Figure 11:
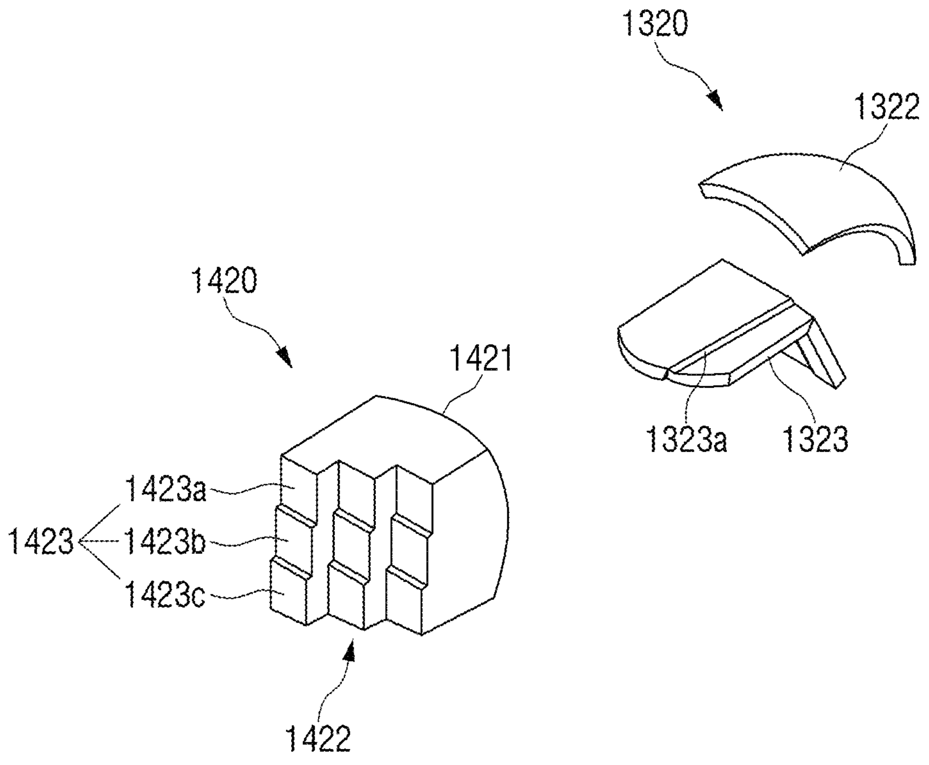
FIGS. 11 and 12 are perspective views of a second light source module and a second lens according to an embodiment of the present disclosure.
Figure 12:
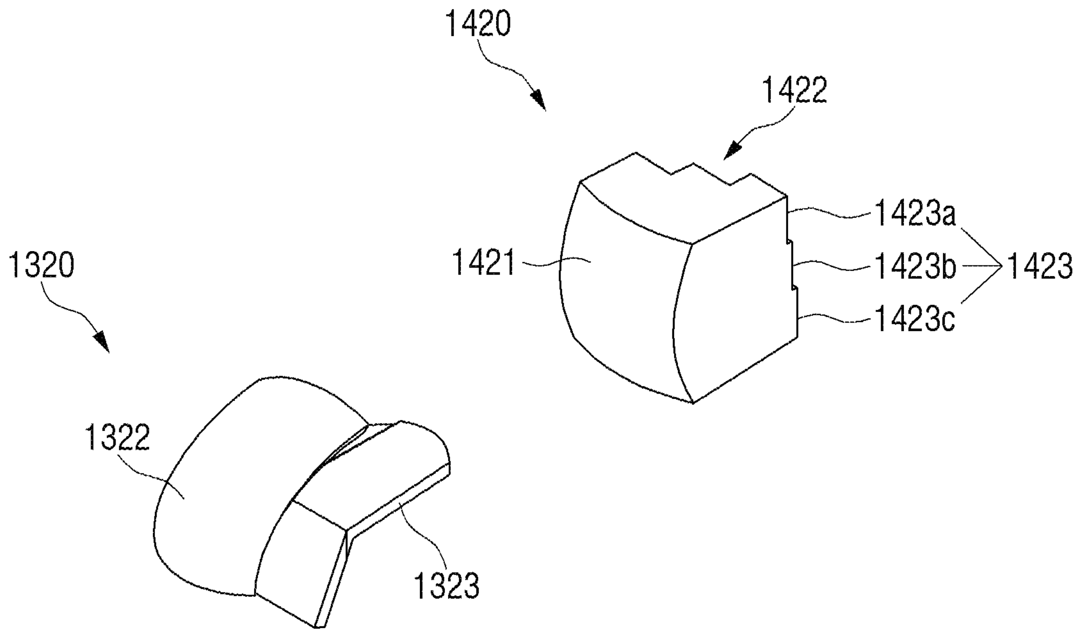
Figure 13:
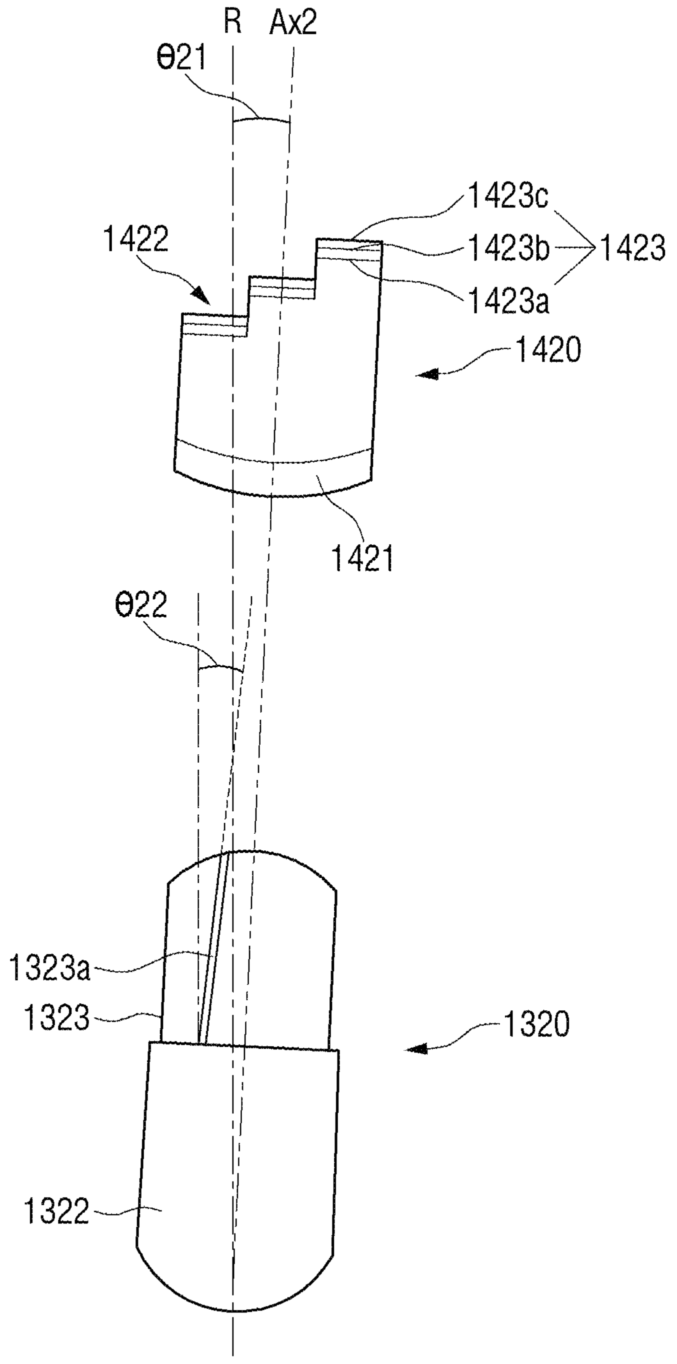
FIG. 13 is a plan view of the second light source module and the second lens according to an embodiment of the present disclosure.
Figure 14:
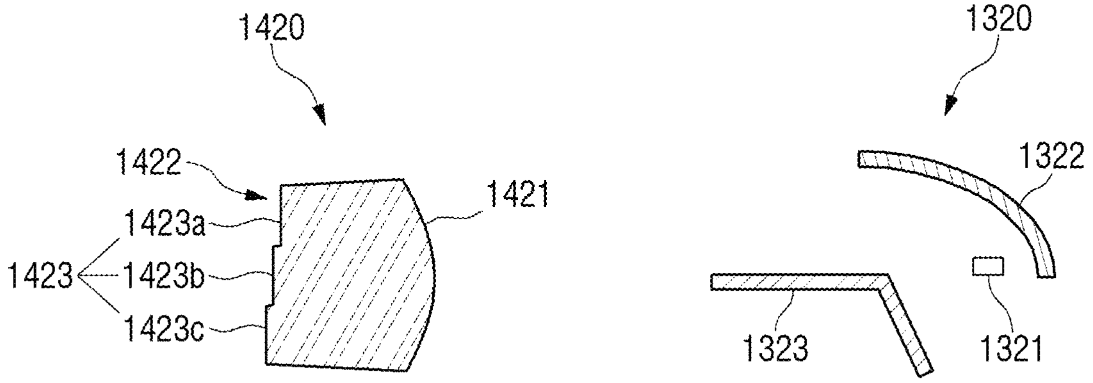
FIG. 14 is a cross-sectional view of the second light source module and the second lens according to an embodiment of the present disclosure.

FIGS. 11 and 12 are perspective views of a second light source module 1320 and a second lens 1420 according to an embodiment of the present disclosure. FIG. 13 is a plan view of the second light source module 1320 and the second lens 1420. FIG. 14 is a cross-sectional view of the second light source module 1320 and the second lens 1420. Referring to 11 to 14, the second light source module 1320 according to an embodiment of the present disclosure may be configured similar to the above-described first light source module 1310 and may include a second light source 1321, a second reflector 1322, and a second shield 1323.

The front end of the second shield 1323 may be configured similar to the above-described first shield 1313 and may have a curved shape that recedes gradually from its center to both sides. This configuration is in consideration that the light incident portion 1421 of the second lens 1420 has a curved shape that is convex rearwardly in the vertical direction and the horizontal direction, similar to the above-described first lens 1410.

The second lens 1420 may have a light emitting portion 1422 that includes a plurality of light emitting modules 1423 arranged in the horizontal (i.e., vehicle's width) direction. Each of the plurality of light emitting modules 1423 may include a plurality of light emitting surfaces 1423*a*, 1423*b*, and 1423*c* arranged in the vertical direction and having a planar shape. With this configuration, the light emitting portion 1422 of the second lens 1420 may include a grid of the plurality of light emitting surfaces.

The second lens 1420 may have a terraced arrangement of the light emitting modules 1423 gradually receding from a first side to a second side in the horizontal direction. Further, the plurality of light emitting surfaces 1423*a*, 1423*b*, and 1423*c* may be in a terraced arrangement gradually advancing in the vertical (e.g., top-to-bottom) direction.

Similar to the above-described first light source module 1310 and the first lens 1410, the second light source module 1320 and the second lens 1420 in this embodiment may form a complete lighting image by arranging them to be tilted and disposed at a predetermined angle θ21 with respect to the reference line R. In such case, the second shield 1323 may be provided with a stepped portion 1323*a* to be laterally spaced apart from the second optical axis Ax2 of the second lens 1420 to allow the cut-off line of the beam pattern to be formed at the desired position. Additionally, when necessary, the stepped portion 1323*a* may be formed to be tilted by a predetermined angle θ22 with respect to the second optical axis Ax2.

Figure 15:
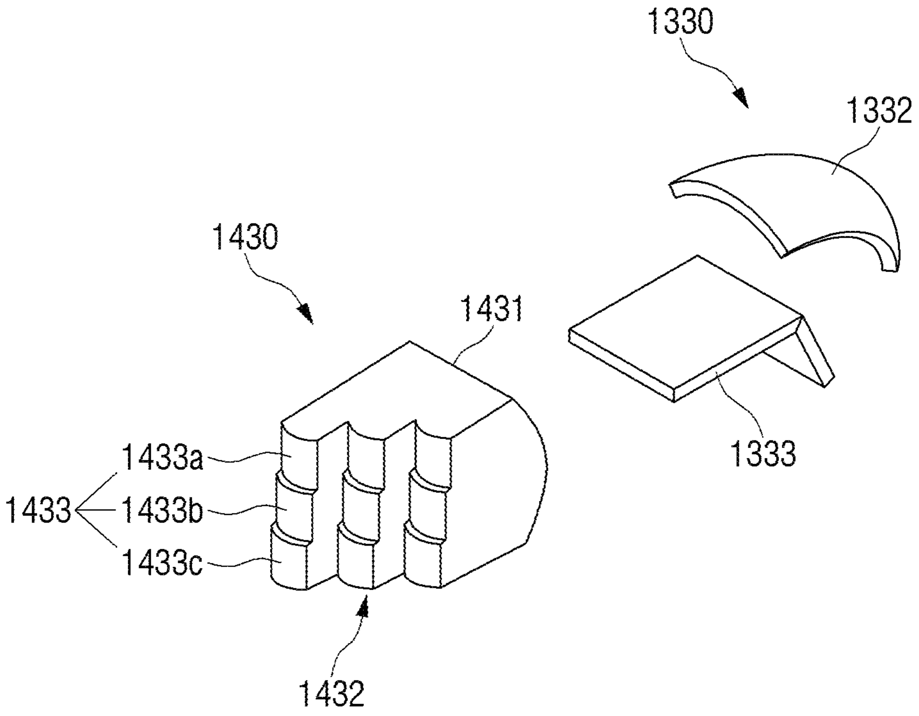
FIGS. 15 and 16 are perspective views of a third light source module and a third lens according to an embodiment of the present disclosure.
Figure 16:
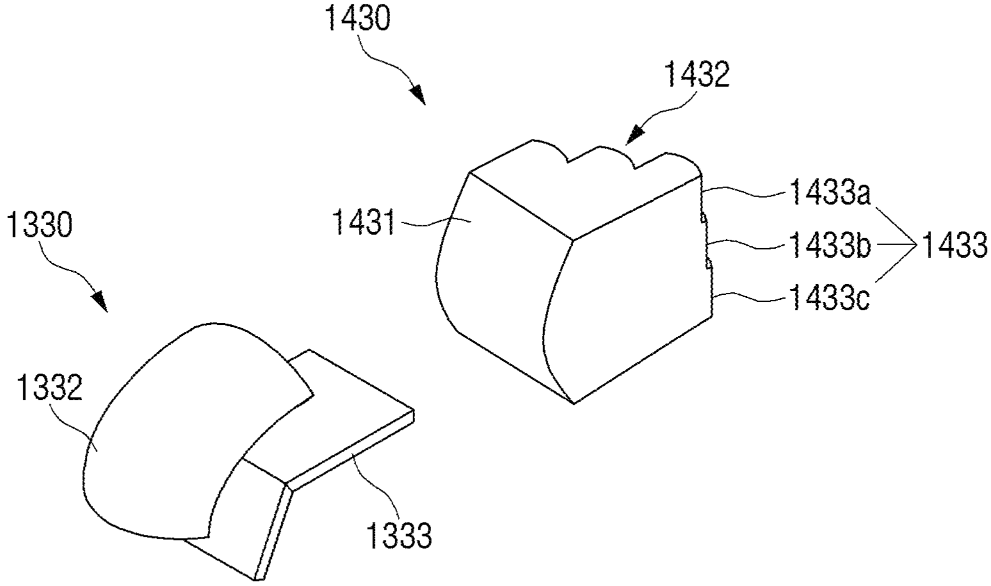
Figure 17:
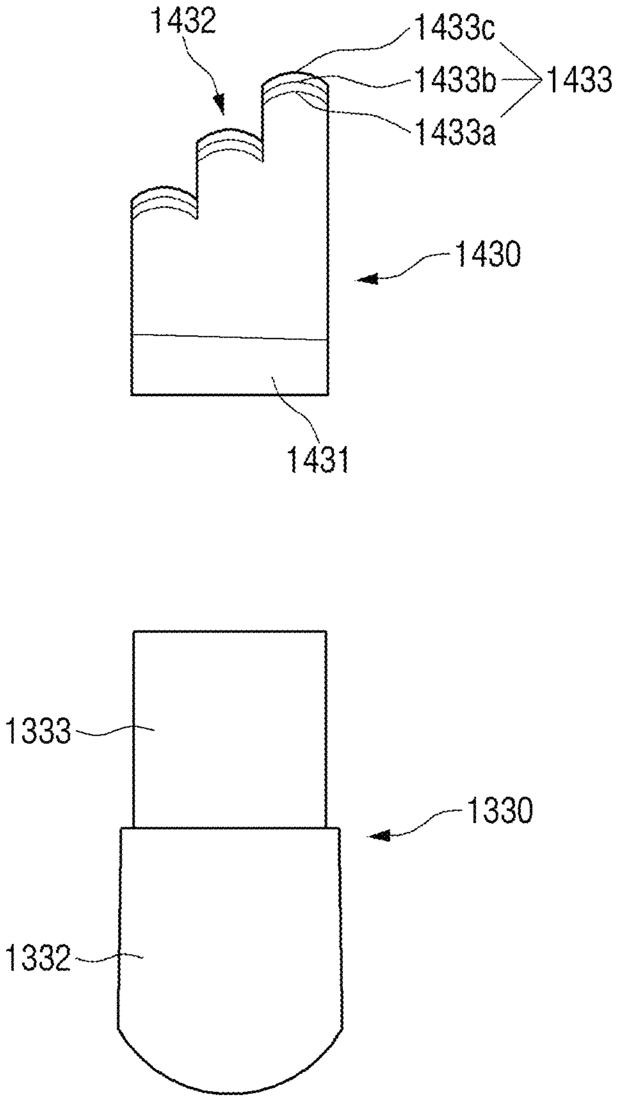
FIG. 17 is a plan view of the third light source module and the third lens according to an embodiment of the present disclosure.
Figure 18:
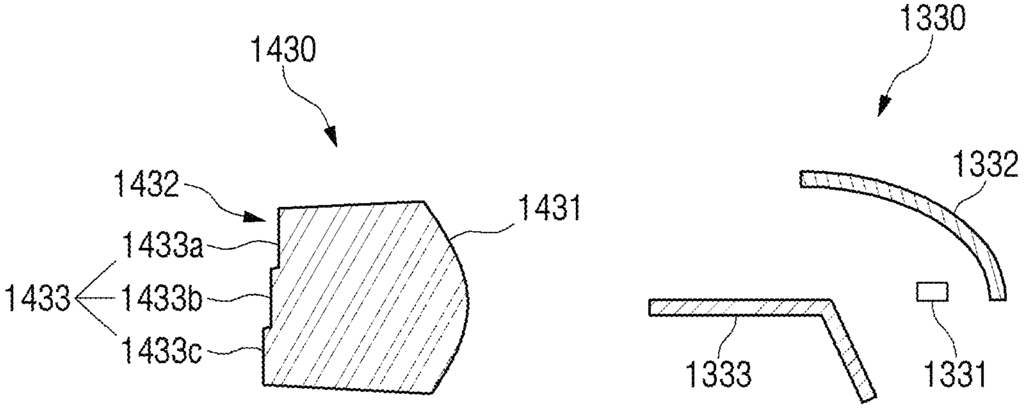
FIG. 18 is a cross-sectional view of the third light source module and the third lens according to an embodiment of the present disclosure.

FIGS. 15 and 16 are perspective views of a third light source module 1330 and a third lens 1430 according to an embodiment of the present disclosure. FIG. 17 is a plan view of the third light source module 1330 and the third lens 1430. FIG. 18 is a cross-sectional view of the third light source module 1330 and the third lens 1430. Referring to FIGS. 15 to 18, similarly to the above-described second light source module 1320, the third light source module 1330 may include a third light source 1331, a third reflector 1332, and a third shield 1333. The third lens 1430 may emit light incident from the third light source module 1330 to the light incident portion 1431, through a light emitting portion 1432 to form the wide region of the beam pattern.

The third light source module 1330 may include no stepped portion formed in the third shield 1333 since, unlike the first light source module 1310 and the second light source module 1320, the third light source module 1330 forms the wide region of the beam pattern having little influence on the formation of the cut-off line. The present disclosure is not limited thereto, however, and the third shield 1333 may also include a stepped portion, similar to the above-described first shield 1313 and the second shield 1323.

The following description will be provided for a case where, unlike the first shield 1313 and the second shield 1323, the front end of the third shield 1333 has a linear shape along the horizontal direction. This configuration is due to the light incident portion 1431 of the third lens 1430, unlike the first lens 1410 and the second lens 1420 described above, having a linear shape in the horizontal directions as well as a curved shape that is convex rearwardly in the vertical directions. This configuration may enable the third light source module 1330 and the third lens 1430 to form a relatively wide region of the beam pattern.

Additionally, the light emitting portion 1432 of the third lens 1430 may have a terraced arrangement of a plurality of light emitting modules 1433 gradually receding from a first side to a second side in the horizontal direction. Each of the plurality of light emitting modules 1433 may include a plurality of light emitting surfaces 1423*a*, 1423*b*, and 1423*c* that are in a terraced arrangement gradually advancing in the vertical direction. The plurality of light emitting surfaces 1433*a*, 1433*b*, and 1433*c* may have a curved shape that is convex forward. This configuration may enable the third light source module 1330 and the third lens 1430 to form a relatively wide region of the beam pattern as described above.

Figure 19:
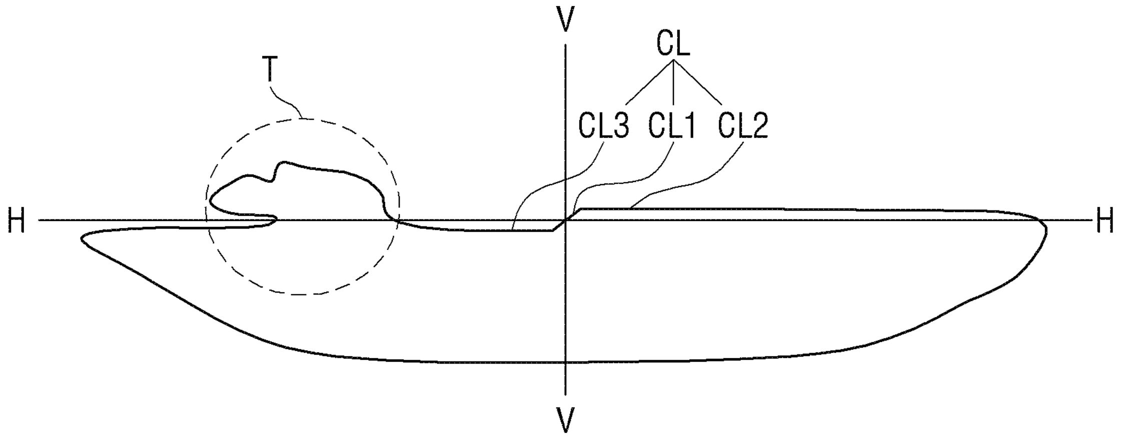
FIG. 19 is a schematic diagram of a region to be removed by a light-blocking member according to an embodiment of the present disclosure.

Further, one or more light-blocking members 1500 may be disposed between adjacent light source modules among the plurality of light source modules 1300 described above. This configuration may prevent an occurrence of glare due to the light generated from any one of the plurality of light source modules 1300 being incident not only to the corresponding lens among the plurality of lenses 1400 but also to other adjacent lenses and be irradiated to the upper side of the cut-off line, causing the region T to form as shown in FIG. 19.

Figure 20:
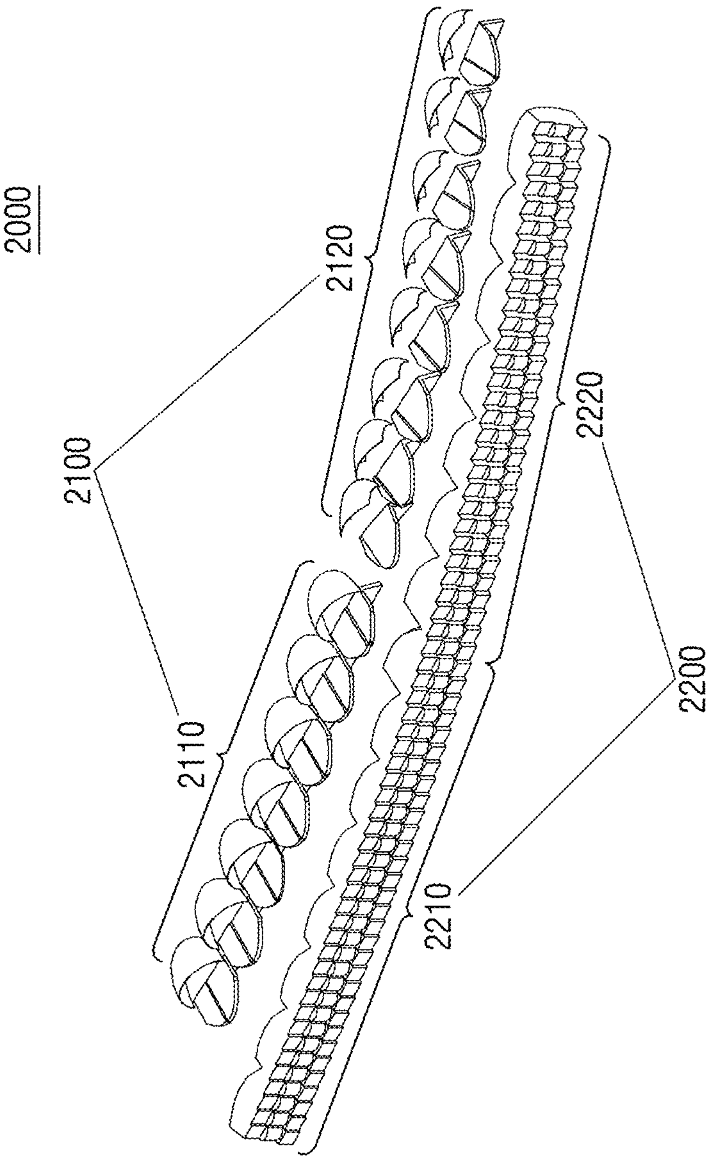
FIGS. 20 and 21 are perspective views of a vehicle lamp according to another embodiment of the present disclosure.
Figure 21:
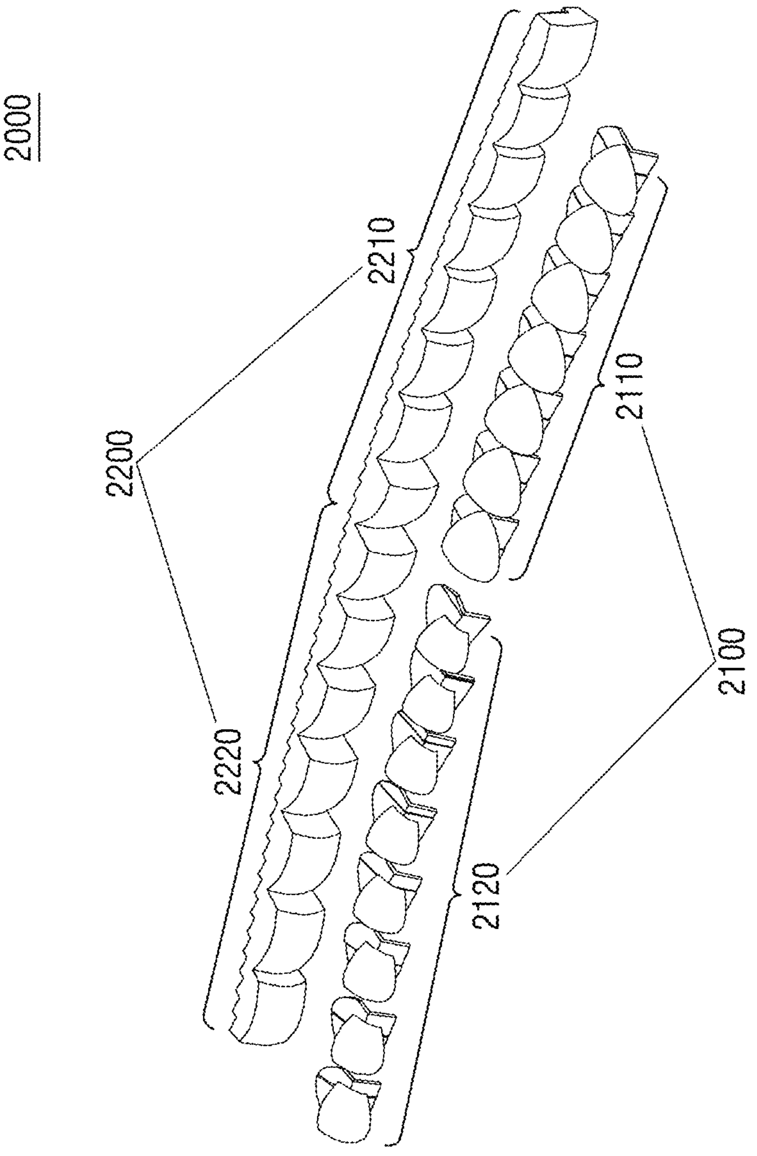
Figure 22:
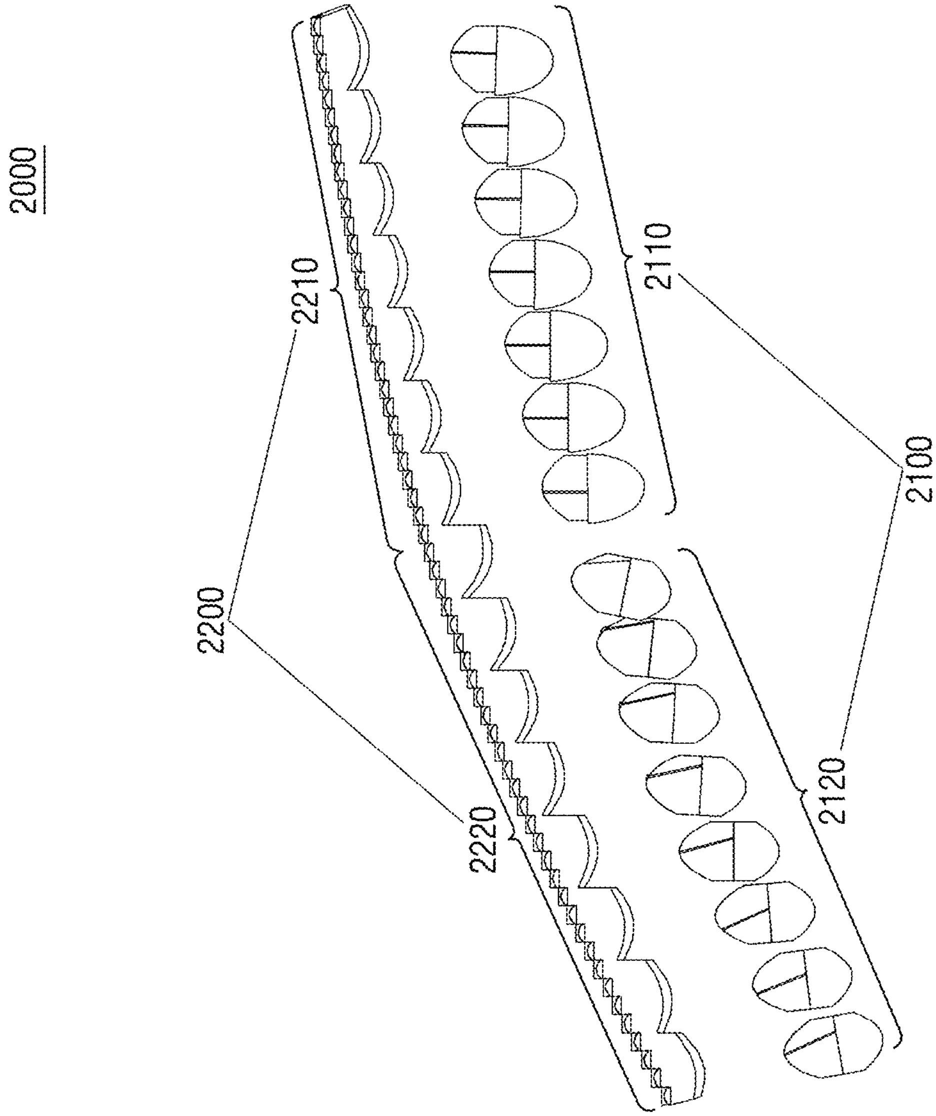
FIG. 22 is a plan view of the vehicle lamp according to another embodiment of the present disclosure.

FIGS. 20 and 21 are perspective views of a vehicle lamp 2000 according to another embodiment of the present disclosure. FIG. 22 is a plan view of the vehicle lamp 2000 according to another embodiment. Referring to FIGS. 20 to 22, the vehicle lamp 2000 according to another embodiment of the present disclosure may include a light emitting unit 2100 and an optical unit 2200.

Figure 23:
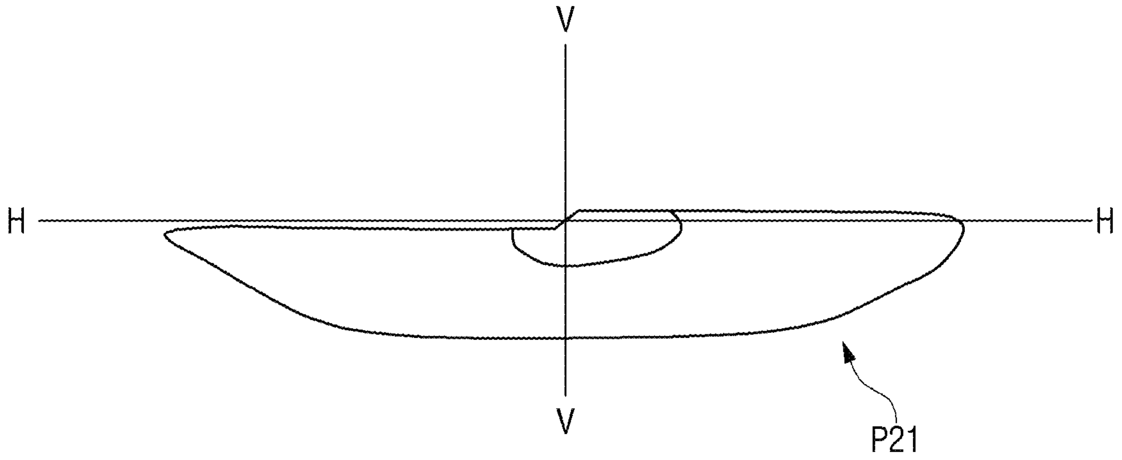
FIGS. 23 and 24 are schematic views of beam patterns formed by a vehicle lamp according to another embodiment of the present disclosure.
Figure 24:
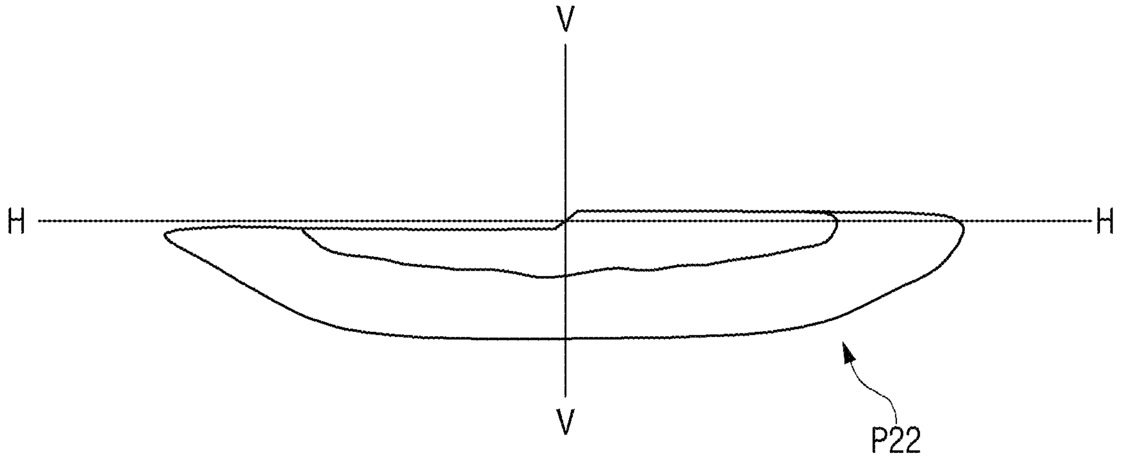

In another embodiment of the present disclosure, unlike the above-described embodiment, the light emitting unit 2100 may include two light source units 2110 and 2120, and the optical unit 2200 may include two lens units 2210 and 2220. With such configuration of another embodiment, the vehicle lamp 2000 may form a pattern region P21 corresponding to a spot-wide region as shown in FIG. 23 and may form a pattern region P22 corresponding to a mid-wide region as shown in FIG. 24.

Depending on the required light distribution characteristics, each light source module of the light emitting unit 2100 in another embodiment may include any one of the first light source module 1310, the second light source module 1320, or the third light source module 1330 of the above-described embodiment, and/or some components of at least one of the first light source module 1310, the second light source module 1320, or the third light source module 1330.

Additionally, for each lens to be incorporated in the optical unit 2200 in another embodiment, any one of the first lens 1410, the second lens 1420, or the third lens 1430, and/or some components of at least one of the first lens 1410, the second lens 1420, or the third lens 1430 may be included depending on the required light distribution characteristics.

As described above, in the vehicle lamps 1000 and 2000 of the present disclosure, the light emitting portions of the respective lenses of the optical units 1200 and 2200 may each include a plurality of light emitting modules arranged in the horizontal direction and a plurality of light emitting surfaces arranged in the vertical direction and in a terraced arrangement gradually advancing in a top-to-bottom direction, and accordingly, an optimal beam pattern may be formed while improving the aesthetics of the vehicle lamp with improved exterior design.

While a few exemplary embodiments of the present disclosure have been described with reference to the accompanying drawings, those skilled in the art will readily appreciate that various changes in form and details may be made therein without departing from the technical idea and scope of the present disclosure as defined by the following claims. Therefore, it is to be understood that the foregoing is illustrative in all respects and is not to be construed as limited to the specific exemplary embodiments disclosed.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A lamp for a vehicle, comprising:

a light emitting unit including a plurality of light source modules arranged in a vehicle's width direction; and an optical unit disposed in front of the light emitting unit, for transmitting light generated from at least one of the plurality of light source modules to form a beam pattern that includes at least one pattern region, the optical unit including a plurality of lenses corresponding respectively to the plurality of light source modules and integrally formed to be arranged in the vehicle's width direction, wherein each of the plurality of light source modules comprises:

a light source that generates the light;

a reflector configured to reflect the light of the light source forward; and a shield configured to obstruct a portion of the light reflected by the reflector and proceeding toward the optical unit, wherein the plurality of light source modules of the light emitting unit are grouped into a plurality of light source units, wherein the plurality of lenses of the optical unit are grouped into a plurality of lens units, wherein the plurality of light source units and the plurality of lens units are each disposed along the vehicle's width direction, wherein the plurality of light source units include a first light source unit and a second light source unit, wherein the plurality of lens units include a first lens unit corresponding to the first light source unit and a second lens unit corresponding to the second light source unit, respectively, and wherein the first light source unit and the first lens unit form a first pattern region of the beam pattern, which is different from a second pattern region that is formed by the second light source unit and the second lens unit.

2. The lamp for a vehicle of claim 1, wherein, among the plurality of light source modules and the plurality of lenses, at least one light source module and at least one lens corresponding to each other are disposed to be tilted by a predetermined angle with respect to a reference line, the reference line being parallel with a vehicle's length direction.

3. The lamp for a vehicle of claim 1, wherein the shield of at least one of the plurality of light source modules comprises:

a blocking surface configured to block a portion of the light reflected by the reflector; and a stepped portion configured to divide the blocking surface into two sides having different heights.

4. The lamp for a vehicle of claim 3, wherein the stepped portion is formed to be disposed laterally spaced apart by a predetermined distance from an optical axis of a corresponding lens among the plurality of lenses.

5. The lamp for a vehicle of claim 3, wherein the stepped portion is formed to be tilted by a predetermined angle with respect to an optical axis of a corresponding lens among the plurality of lenses.

6. The lamp for a vehicle of claim 1, wherein the shield of at least one of the plurality of light source modules has a frontal end formed in a curved shape gradually receding backward toward both sides from a center thereof.

7. The lamp for a vehicle of claim 1, wherein at least one light source module of the plurality of light source modules further includes an extension that protrudes from a front end of the reflector toward a corresponding lens among the plurality of lenses, and wherein a first end of the extension that is closer to the reflector is disposed above a second end thereof.

8. The lamp for a vehicle of claim 7, wherein the extension of the at least one light source module is configured to elevate a lower boundary of the pattern region formed by the at least one light source module.

9. The lamp for a vehicle of claim 1, wherein each of the plurality of lenses comprises:

a light incident portion; and a light emitting portion configured to emit the light incident to the light incident portion, and wherein the light emitting portion includes at least one light emitting module, each including a plurality of light emitting surfaces disposed in a vertical direction.

10. The lamp for a vehicle of claim 9, wherein the light incident portion has a curvature in at least one direction and has a rearwardly convex shape.

11. The lamp for a vehicle of claim 9, wherein each of the plurality of light emitting surfaces is formed in a forwardly convex curve.

12. The lamp for a vehicle of claim 9, wherein the plurality of light emitting surfaces are in a stepped or terraced arrangement gradually advancing in a top-to-bottom direction.

13. The lamp for a vehicle of claim 9, wherein the at least one light emitting module comprises a plurality of light emitting modules, and wherein the plurality of light emitting modules are in a stepped or terraced arrangement gradually advancing or gradually receding from a first side to a second side in the vehicle's width direction.

14. The lamp for a vehicle of claim 1, further comprising:

a light-blocking member disposed between adjacent light source modules among the plurality of light source modules.

15. The lamp for a vehicle of claim 14, wherein the light blocking member is configured to obstruct the light generated from any one light source module of the plurality of light source modules from proceeding to a lens adjacent to a lens that corresponds to the any one light source module, among the plurality of lenses.

16. A lamp for a vehicle, comprising:

a light emitting unit including a plurality of light source modules arranged in a vehicle's width direction; and an optical unit disposed in front of the light emitting unit, for transmitting light generated from at least one of the plurality of light source modules to form a beam pattern that includes at least one pattern region, the optical unit including a plurality of lenses corresponding respectively to the plurality of light source modules and integrally formed to be arranged in the vehicle's width direction, wherein each of the plurality of light source modules comprises:

a light source that generates the light;

a reflector configured to reflect the light of the light source forward; and a shield configured to obstruct a portion of the light reflected by the reflector and proceeding toward the optical unit, wherein each of the plurality of lenses comprises:

a light incident portion; and a light emitting portion configured to emit the light incident to the light incident portion, and wherein the light emitting portion includes at least one light emitting module, each including a plurality of light emitting surfaces disposed in a vertical direction.

17. The lamp for a vehicle of claim 16, wherein the light incident portion has a curvature in at least one direction and has a rearwardly convex shape.

18. The lamp for a vehicle of claim 16, wherein each of the plurality of light emitting surfaces is formed in a forwardly convex curve.

19. The lamp for a vehicle of claim 16, wherein the plurality of light emitting surfaces are in a stepped or terraced arrangement gradually advancing in a top-to-bottom direction.

20. The lamp for a vehicle of claim 16, wherein the at least one light emitting module comprises a plurality of light emitting modules, and wherein the plurality of light emitting modules are in a stepped or terraced arrangement gradually advancing or gradually receding from a first side to a second side in the vehicle's width direction.

* * * * *